United States Patent
Sakaguchi et al.

(10) Patent No.: US 7,137,526 B2
(45) Date of Patent: *Nov. 21, 2006

(54) HIGH-PRESSURE TANK AND METHOD FOR FABRICATING THE SAME

(75) Inventors: Teppei Sakaguchi, Osaka (JP); Yoshiki Sakaguchi, Osaka (JP); Shaun C. Hogan, Brigham City, UT (US)

(73) Assignees: Samtech Corporation, Osaka (JP); Samtech International, Inc., Carson, CA (US); Hypercom Engineering, Inc., Brigham City, UT (US)

( * ) Notice: Subject to any disclaimer, the term of this patent is extended or adjusted under 35 U.S.C. 154(b) by 353 days.

This patent is subject to a terminal disclaimer.

(21) Appl. No.: 10/600,597

(22) Filed: Jun. 23, 2003

(65) Prior Publication Data

US 2004/0104235 A1    Jun. 3, 2004

Related U.S. Application Data

(63) Continuation-in-part of application No. 10/307,495, filed on Dec. 2, 2002, now Pat. No. 6,908,006.

(51) Int. Cl.
*F17C 1/02* (2006.01)

(52) U.S. Cl. .................................................. 220/601
(58) Field of Classification Search .................... None
See application file for complete search history.

(56) References Cited

U.S. PATENT DOCUMENTS 406,886 A * 7/1889 Crocker et al. ............. 220/565

OTHER PUBLICATIONS

Japanese Patent Publication No. 3251216 and an English abstract of Japanese Published Unexamined Patent Application No. 11-104762 A.

* cited by examiner

*Primary Examiner*—Stephen Castellano
(74) *Attorney, Agent, or Firm*—Nixon Peabody LLP; Donald R. Studebaker

(57) ABSTRACT

A cylindrical reinforcing collar is fitted onto a cylindrical gas discharge section of a tank body and then engaged integrally on the exterior of the tank body between the cylindrical gas discharge section and the dome section by shrink fitting. This provides, easily and inexpensively, a high-pressure tank capable of withstanding high pressures of 35 to 75 MPa while keeping its lightness in weight.

4 Claims, 6 Drawing Sheets

HIGH-PRESSURE TANK AND METHOD FOR FABRICATING THE SAME

CROSS-REFERENCE TO RELATED APPLICATIONS

This application is a continuation-in-part application of U.S. patent application Ser. No. 10/307,495 filed on Dec. 2, 2002 now Pat. No. 6,908,006.

BACKGROUND OF THE INVENTION

1. Field of the Invention

This invention relates to improvements of a high-pressure tank into which high-pressure gas is charged and improvements of a method for fabricating the same.

2. Description of the Related Art

High-pressure tanks into which a gas, such as natural gas or hydrogen gas, is charged and stored at high pressure, are generally subjected to winding which is a technique for wrapping carbon fibers or the like around the tank body for reinforcement. A cylindrical gas discharge section and a continuous dome section of the tank, in particular, are likely to concentrate stress and therefore must be reinforced firmly. However, the vicinity of the boundary between the dome section and the cylindrical gas discharge section is difficult to subject to winding and thus difficult to reinforce.

Therefore, the dome section and the cylindrical gas discharge section are generally increased in thickness as compared with a cylindrical middle section of the tank by necking a predetermined region of an elongated hollow cylindrical blank continuing from its opening end by means of spinning.

In this connection, the applicant filed a patent application on a technique for further thickening the dome section and the cylindrical gas discharge section by flow forming the predetermined region of the elongated hollow cylindrical blank continuing from its opening end into a larger thickness than the other region and then necking the thickened predetermined region through spinning, and has already obtained a patent for the technique (see, for example, Patent document 1)

[Patent Document 1]

Japanese Patent Publication No. 3251216 (page 3 and FIG. 1)

For the first-mentioned technique, however, there is a limit to how much the thickness of the dome section and the cylindrical gas discharge section can be increased because of the use of an elongated hollow cylindrical blank having a uniform thickness as a whole. Therefore, this technique is difficult to apply particularly to high-pressure tanks for hydrogen gas into which the gas is charged at a pressure of between 35 MPa and 75 MPa.

To cope with this, it can be considered to ensure the thickness of the dome section and the cylindrical gas discharge section by increasing the thickness of the entire middle section of the elongated hollow cylindrical blank. In this case, however, the entire high-pressure tank thus fabricated will also be thickened and thereby increased in weight, which hinders weight reduction. In addition, since the tank uses the thick elongated hollow cylindrical blank, its material cost will be high.

On the other hand, for the second-mentioned Patent document 1, since the predetermined region of the elongated hollow cylindrical blank continuing from the opening end is increased in thickness as compared with the other region, the dome section and the cylindrical gas discharge section can have a larger thickness as compared with the first-mentioned technique and the entire tank weight can be reduced by thinning the middle section. This Patent document 1 technique, however, requires the elongated hollow cylindrical blank to undergo two process steps of flow forming and spinning, which takes much labor. In addition, in order to ensure a sufficient thickness of a dome section and a cylindrical gas discharge section in a high-pressure tank for hydrogen gas, it is necessary to increase the amount of reduction of the blank. This may invite the complete closure of the cylindrical gas discharge section and thereby necessitate subsequent boring of a gas outlet in a later process step, which requires extra labor.

SUMMARY OF THE INVENTION

The present invention has been made in view of the foregoing points and therefore its object is to provide easily and inexpensively a high-pressure tank capable of fully withstanding high pressures of 35 to 75 MPa while keeping its lightness in weight.

To attain the above object, the present invention is characterized in that part of the exterior of the tank between the cylindrical gas discharge section and the dome section is reinforced by a separate member, and takes the following solutions.

The invention claimed in claims 1 to 4 is concerned with a high-pressure tank. The high-pressure tank as claimed in claim 1 is characterized by comprising: a metallic tank body in which a cylindrical gas discharge section is protruded integrally from one end of a cylindrical middle section through a dome section; and a cylindrical metallic reinforcing collar engaged integrally on the exterior of the tank body between the cylindrical gas discharge section and the dome section by fitting of the reinforcing collar onto the cylindrical gas discharge section of the tank body.

With the above structure, in the invention of claim 1, the cylindrical gas discharge section and the neighboring dome section, likely to concentrate stress, can be increased in effective thickness by the thickness of the reinforcing collar, thereby obtaining sufficient strength in these sections. This provides a high-pressure tank strong enough to withstand high pressures of 35 to 75 MPa. Further, since the reinforcing collar is fitted not on the entire tank body but only on its part: the dome section and the cylindrical gas discharge section, this does not so much increase the weight of the entire high-pressure tank and maintains light weight, and provides facilitated fabrication and reduced cost.

The high-pressure tank as claimed in claim 2 is characterized in that in the invention of claim 1, the reinforcing collar is formed of a cylindrical part fitted onto the cylindrical gas discharge section of the tank body, and an extension extended radially outwardly from one end of the cylindrical part, the back of the extension is formed with an annular boss, and the exterior of the tank body is formed with an annular fitting recess in the vicinity of the boundary between the dome section and the cylindrical gas discharge section so that the annular boss is fitted into the annular fitting recess with the reinforcing collar engaged on the exterior of the tank body between the cylindrical gas discharge section and the dome section.

With the above structure, in the invention of claim 2, the fitting of the boss of the reinforcing collar into the fitting recess of the dome section provides a firm engagement between the tank body and the reinforcing collar. Furthermore, the existence of the annular boss increases the thickness of that particular portion of the reinforcing collar and thereby increases the strength accordingly.

The high-pressure tank as claimed in claim 3 is characterized in that in the invention of claim 1 or 2, the reinforcing collar is made of a steel alloy or a titanium alloy.

With the above structure, in the invention of claim 3, the dome section and the cylindrical gas discharge section, likely to concentrate stress, can be further increased in strength thanks to the mechanical properties of a steel alloy or a titanium alloy which is a material for the reinforcing collar.

The high-pressure tank as claimed in claim 4 is characterized in that in the invention of claim 1 or 2, the tank body is made of an aluminum alloy.

With the above structure, in the invention of claim 4, the tank body of an aluminum alloy is light in weight, which further reduces the tank weight as a whole.

The invention claimed in claims 5 and 6 is concerned with a method for fabricating a high-pressure tank. The method as claimed in claim 5 is characterized by comprising the steps of plastically deforming a hollow cylindrical blank of metal with rotation to form a tank body in which a cylindrical gas discharge section is protruded integrally from one end of a cylindrical middle section through a dome section; and then fitting a cylindrical metallic reinforcing collar onto the cylindrical gas discharge section of the tank body and engaging the reinforcing collar integrally on the exterior of the tank body between the cylindrical gas discharge section and the dome section by shrink fitting.

With the above structure, in the invention of claim 5, the additional reinforcing collar need only be fitted onto the cylindrical gas discharge section of the tank body. Accordingly, a high-pressure tank having a light weight and capable of withstanding high pressures of 35 to 75 MPa can be fabricated easily without requiring much labor.

The method as claimed in claim 6 is characterized by comprising the steps of: plastically deforming a hollow cylindrical blank of metal with rotation to form a tank body in which a cylindrical gas discharge section is protruded integrally from one end of a cylindrical middle section through a dome section, followed by forming an annular fitting recess circumferentially in the exterior of the tank body in the vicinity of the boundary between the dome section and the cylindrical gas discharge section; and then fitting a cylindrical metallic reinforcing collar having an annular boss onto the cylindrical gas discharge section of the tank body to fit the boss in the fitting recess of the dome section and engaging the reinforcing collar integrally on the exterior of the tank body between the cylindrical gas discharge section and the dome section by shrink fitting.

With the above structure, in the invention of claim 6, the additional reinforcing collar need only be fitted onto the cylindrical gas discharge section of the tank body to fit the boss in the fitting recess of the dome section. Accordingly, a high-pressure tank having a light weight and capable of fully withstanding high pressures of 35 to 75 MPa can be fabricated easily without requiring much labor. Furthermore, since the thickness of the portion of the reinforcing collar fitted with the fitting recess is increased, the strength of that portion is increased accordingly.

DESCRIPTION OF PREFERRED EMBODIMENT

Hereinafter, embodiments of the present invention will be described with reference to the drawings.

Embodiment 1

Figure 1:
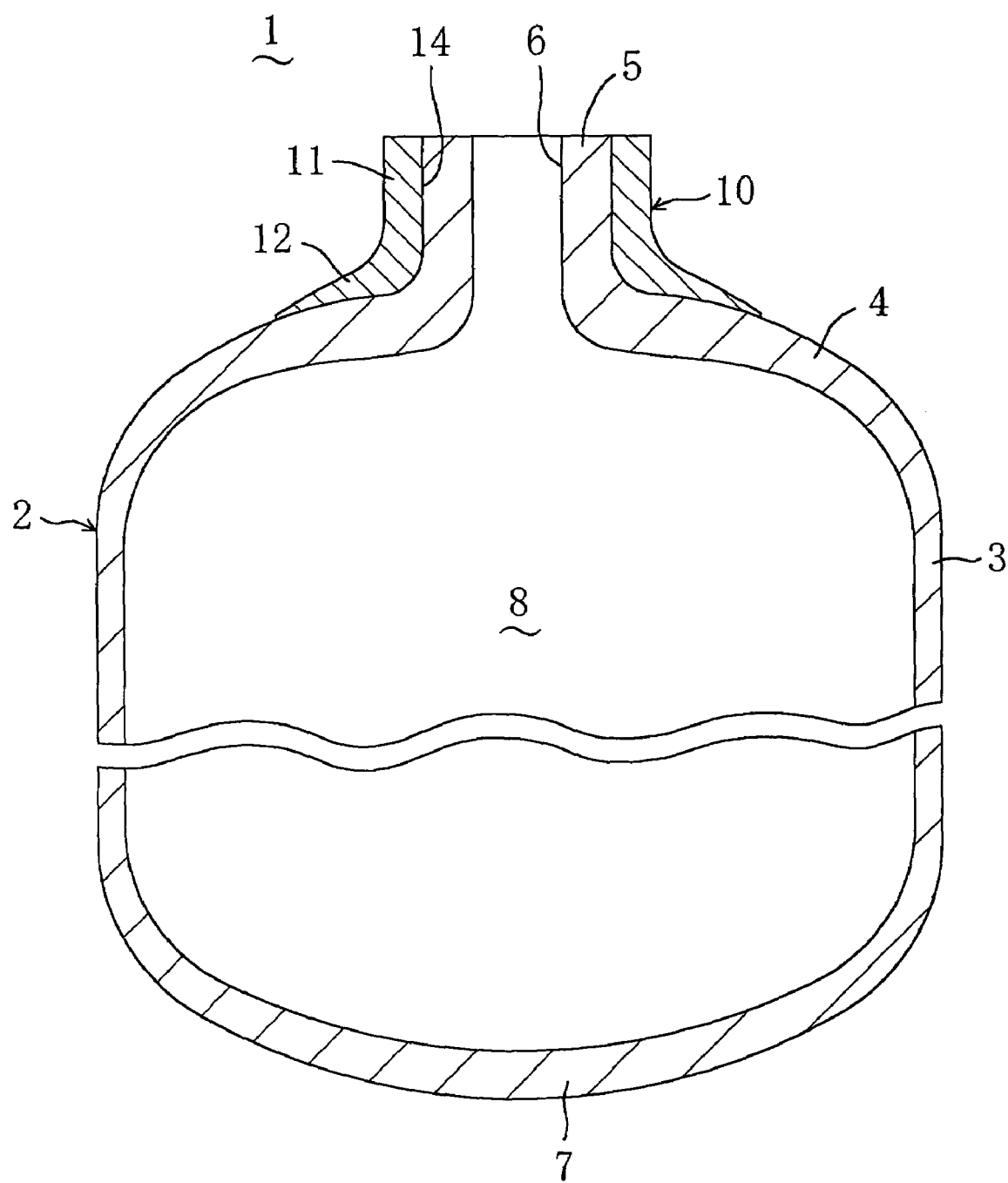
FIG. 1 is a longitudinal cross-sectional view of a high-pressure tank according to Embodiment 1 of the present invention.

FIG. 1 shows a high-pressure tank 1 according to Embodiment 1 of the present invention. The high-pressure tank 1 includes a tank body 2 into which high-pressure gas, such as hydrogen gas, of 35 to 75 MPa is charged. The tank body 2 is formed so that a cylindrical gas discharge section 5 circular in cross section is protruded integrally from one end of a cylindrical middle section 3 circular in cross section through a dome section 4, the cylindrical gas discharge section 4 is formed with a gas outlet 6 and the cylindrical middle section 3 is integrally formed at the other end with a bottom section 7. The tank body 2 is provided internally with a hollow part 8 for containing high-pressure gas.

The tank body 2 is made of an aluminum alloy such as JIS A 6061 or JIS A 6062, formed by plastically deforming a hollow cylindrical blank and subjected to heat treatment such as T6 treatment after the forming. The dome section 4, the cylindrical gas discharge section 5 and the bottom section 7 are formed to have greater thicknesses than the cylindrical middle section 3. In particular, the dome section 4 is, due to its forming process, gradually increased in thickness from that of the middle section 3 to that of the cylindrical gas discharge section 5 in proceeding from the middle section 3 to the cylindrical gas discharge section 5, thereby reinforcing the dome section 4 which is likely to concentrate stress.

Figure 2:
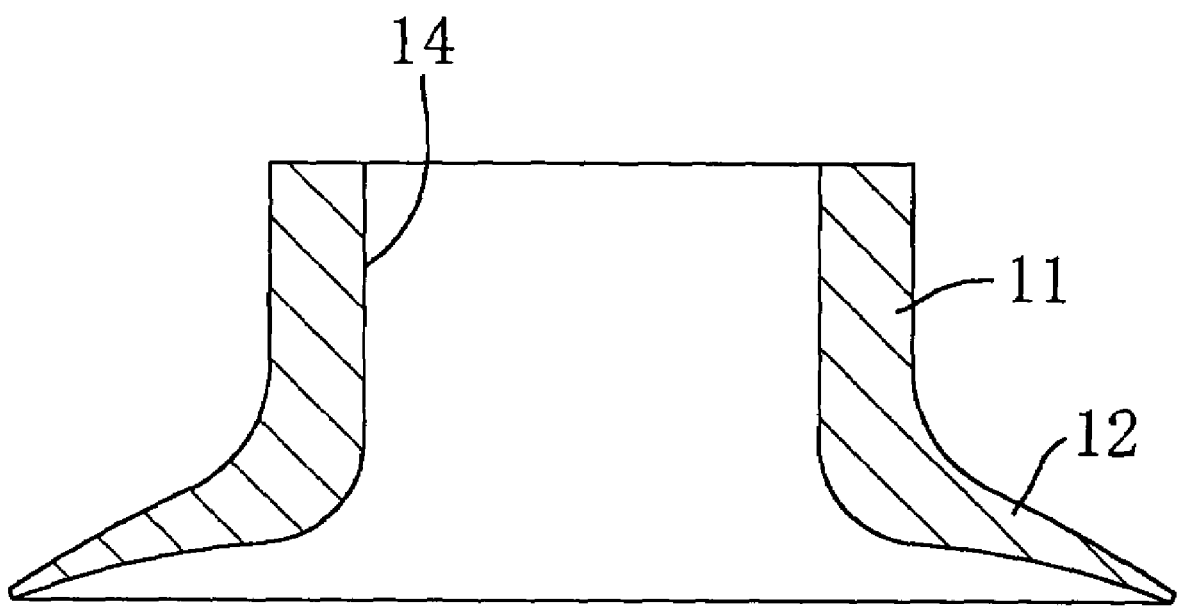
FIG. 2 is a longitudinal cross-sectional view of a reinforcing collar used for the high-pressure tank according to Embodiment 1 of the present invention.

As a feature of the present invention, a cylindrical metallic reinforcing collar 10 is engaged integrally onto the exterior of the tank body 2 between the cylindrical gas discharge section 5 and the dome section 4 by shrink fitting. The reinforcing collar 10 is, as also shown in FIG. 2, composed of a cylindrical part 11 of circular cross section having substantially the same thickness as the cylindrical gas discharge section 5, and an extension 12 formed integrally at the lower end of the cylindrical part 11 to extend outwardly. The extension 12 is gradually reduced in thickness proceeding to its outer edge, so that the outer edge of the extension 12 merges with the exterior of the dome section 4 smoothly. The reinforcing collar 10 is made of a steel alloy, such as SNCM440, SCM440 or SKD61, or a titanium alloy and formed by forging or turning. Materials for the reinforcing collar, however, are not limited to the above but need only be those which are higher in strength-to-weight ratio than aluminum. Such materials make a great contribution to weight reduction. Further, the reinforcing collar 10 is fitted integrally on the cylindrical gas discharge section 5 of the tank body 2 with the cylindrical gas discharge section 5 inserted in the fitting hole 14, and the reinforcing collar 10 is engaged integrally on the exterior of the tank body 2 between the cylindrical gas discharge section 5 and the dome section 4 by shrink fitting.

As described above, the cylindrical gas discharge section 5 and the neighboring dome section 4 has a larger thickness as compared with the cylindrical middle section 3. The fitting of the reinforcing collar 10 on these sections can further increase their effective thickness, and in addition increase their strength much more in combination with the mechanical properties of a steel alloy or a titanium alloy which is a material for the reinforcing collar 10. Accordingly, there can be provided a high-pressure tank 1 strong enough to withstand high-pressures of 35 to 75 MPa.

Further, since the fitting position of the reinforcing collar 10 is not the entire tank body 2 but limited to the dome section 4 and the cylindrical gas discharge section 5 which are likely to concentrate stress, this avoids a large increase in weight of the high-pressure tank 1, thereby keeping its lightness in weight, and provides facilitated fabrication and reduced cost. Furthermore, since the tank body 2 is made of an aluminum alloy and therefore light in weight, the tank weight can be further reduced as a whole.

Next, description will be made about an example of fabrication methods for the high-pressure tank 1 having the above-described structure.

Figure 3A:
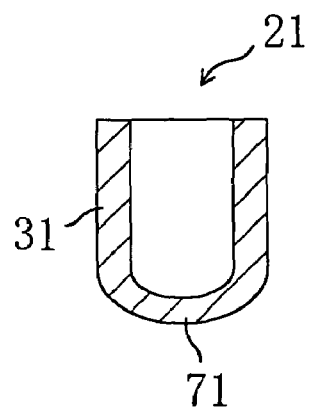
FIG. 3A is a longitudinal cross-sectional view of a short hollow cylindrical blank provided for flow forming included in a fabrication process from a blank to a finished product of the high-pressure tank according to Embodiment 1 of the present invention.

First, prepared is a short hollow cylindrical blank 21 of an aluminum alloy as shown in FIG. 3A. The short hollow cylindrical blank 21 is formed, for example, by forging a solid cylindrical billet, which is not shown, and has the shape of an end-closed cylinder in which a cylindrical middle section 31 is formed integrally with a bottom section 71. Alternatively, the shape of an end-closed cylinder may be formed by drawing a disk-shaped material with a die and a punch.

Figure 3B:
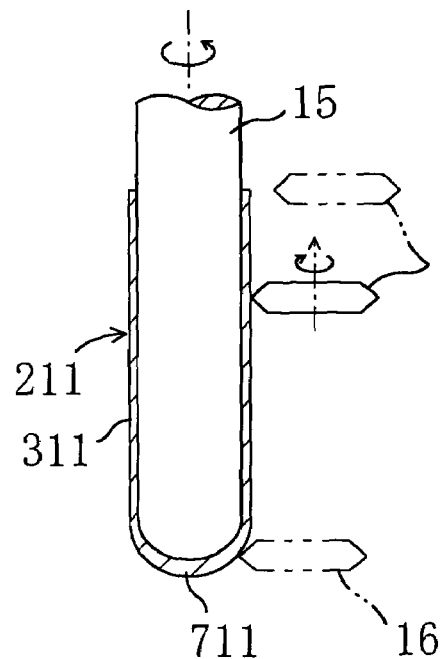
FIG. 3B is a diagram showing a flow forming step included in the fabrication process from a blank to a finished product of the high-pressure tank according to Embodiment 1 of the present invention.

Then, the short hollow cylindrical blank 21 is flow formed. The manner of the flow forming is as shown in FIG. 3B: the short hollow cylindrical blank 21 is fitted on a mandrel 15, the mandrel 15 is rotated on its axis to rotate the short hollow cylindrical blank 21 as a single unit, and a forming roll 16 is pressed against the outer periphery of the short hollow cylindrical blank 21 to rotate while applying force to the middle section 31 in the axial direction. In this manner, the short hollow cylindrical blank 21 is plastically deformed to form an elongated hollow cylindrical blank 211. At this stage, the thicknesses of a middle section 311 and a bottom section 711 become equal to those of a middle section 3 and a bottom section 7 of a tank body 2 in a tank as a final product.

Figure 3C:
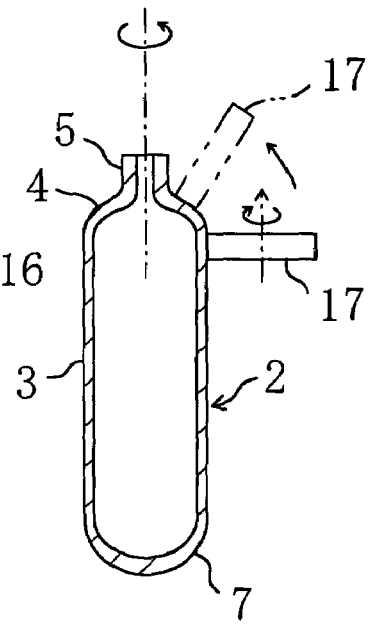
FIG. 3C is a diagram showing a spinning step included in the fabrication process from a blank to a finished product of the high-pressure tank according to Embodiment 1 of the present invention.

Subsequently, the elongated hollow cylindrical blank 211 is held by an unshown chucking device, and a predetermined region starting from the opening end is necked by spinning. The manner of the necking in process is as shown in FIG. 3C: the elongated hollow cylindrical blank 211 is rotated on its axis, and in this state a forming roll 17 is pressed in an inclined position against the predetermined region starting from the opening end of the elongated hollow cylindrical blank 211 to rotate while moving obliquely with respect to the axis of the elongated hollow cylindrical blank 211. In this manner, the predetermined region starting from the opening end of the elongated hollow cylindrical blank 211 is plastically deformed, resulting in the formation of a tank body 2 in which a cylindrical gas discharge section 5 is protruded integrally from one end of a cylindrical middle section 3 through a dome section 4. The tank body 2 is formed so that the dome section 4 is gradually increased in thickness proceeding from the cylindrical middle section 3 to the cylindrical gas discharge section 5 through the necking by spinning as described above.

Figure 3D:
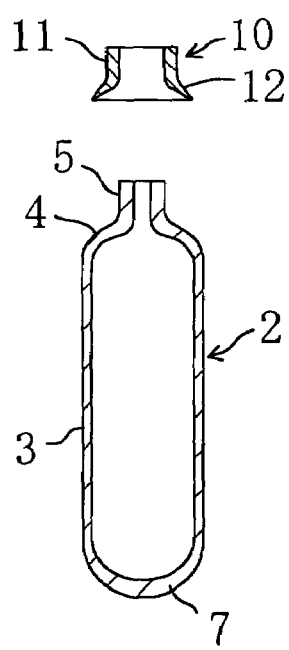
FIG. 3D is a longitudinal cross-sectional view showing a state before a reinforcing collar is fitted onto the tank body by shrink fitting in the fabrication process from a blank to a finished product of the high-pressure tank according to Embodiment 1 of the present invention.

Thereafter, as shown in FIG. 3D, prepared is a reinforcing collar 10 of a steel alloy or a titanium alloy obtained by an additional forging or turning. As described above, the reinforcing collar 10 has a cylindrical part 11 and an extension 12 formed integrally at the lower end of the cylindrical part 11, and the reinforcing collar 10 is formed internally with a fitting hole 14 which passes through the cylindrical part 11 and the extension 12 vertically (see FIG. 2). The inner diameter of the fitting hole 14 is selected by taking into consideration a fitting allowance for shrink fitting relative to the outer diameter of the cylindrical gas discharge section 5.

Figure 3E:
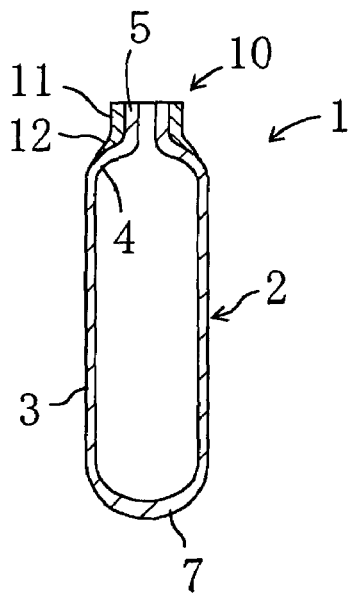
FIG. 3E is a longitudinal cross-sectional view showing a state that the reinforcing collar is fitted onto the tank body by shrink fitting in the fabrication process from a blank to a finished product of the high-pressure tank according to Embodiment 1 of the present invention.

Then, as shown in FIG. 3E, the reinforcing collar 10 is fitted onto the cylindrical gas discharge section 5 of the tank body 2. Subsequently, the reinforcing collar 10 is engaged integrally on the exterior of the tank body 2 between the cylindrical gas discharge section 5 and the dome section 4 by shrink fitting.

As can be understood from the above, the additionally prepared reinforcing collar 10 need only be fitted onto the cylindrical gas discharge section 5 of the tank body 2. Accordingly, a high-pressure tank 1 can be fabricated easily without requiring much labor.

Embodiment 2

Figure 4:
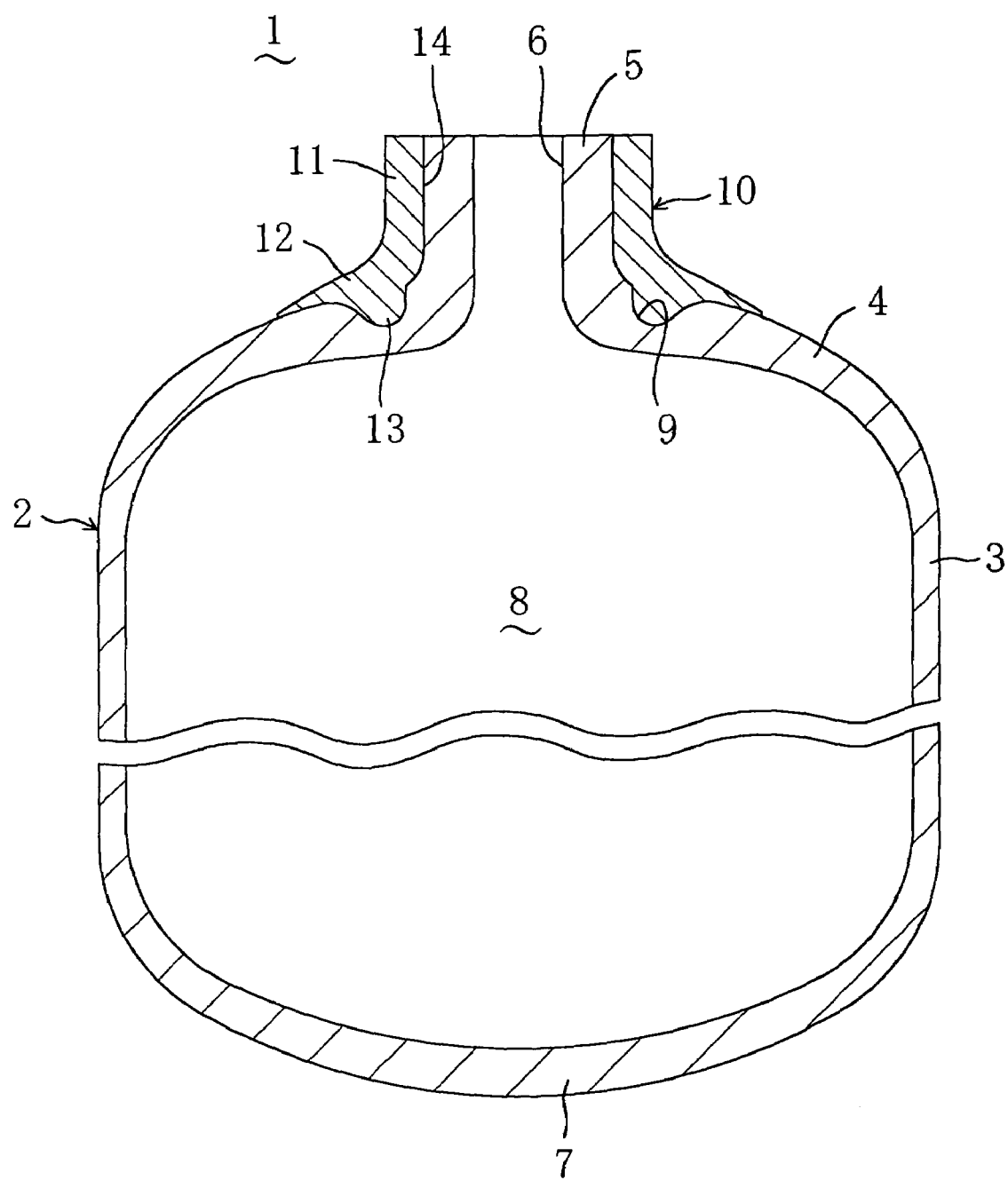
FIG. 4 is a longitudinal cross-sectional view of a high-pressure tank according to Embodiment 2 of the present invention.

FIG. 4 shows a high-pressure tank 1 according to Embodiment 2 of the present invention. The high-pressure tank 1 includes a tank body 2 into which high-pressure gas, such as hydrogen gas, of 35 to 75 MPa is charged. The tank body 2 is formed so that a cylindrical gas discharge section 5 circular in cross section is protruded integrally from one end of a cylindrical middle section 3 circular in cross section through a dome section 4, the cylindrical gas discharge section 4 is formed with a gas outlet 6 and the cylindrical middle section 3 is integrally formed at the other end with a bottom section 7. The tank body 2 is provided internally with a hollow part 8 for containing high-pressure gas.

The tank body 2 is made of an aluminum alloy such as JIS A 6061 or JIS A 6062, formed by plastically deforming a hollow cylindrical blank and subjected to heat treatment such as T6 treatment after the forming. The dome section 4, the cylindrical gas discharge section 5 and the bottom section 7 are formed to have greater thicknesses than the cylindrical middle section 3. In particular, the dome section 4 is, due to its forming process, gradually increased in thickness from that of the middle section 3 to that of the cylindrical gas discharge section 5 in proceeding from the middle section 3 to the cylindrical gas discharge section 5, thereby reinforcing the dome section 4 which is likely to concentrate stress. Further, as a feature of Embodiment 2, an annular fitting recess 9 is formed circumferentially in the exterior of the tank body in the vicinity of the boundary between the dome section 4 and the cylindrical gas discharge section 5.

Figure 5:
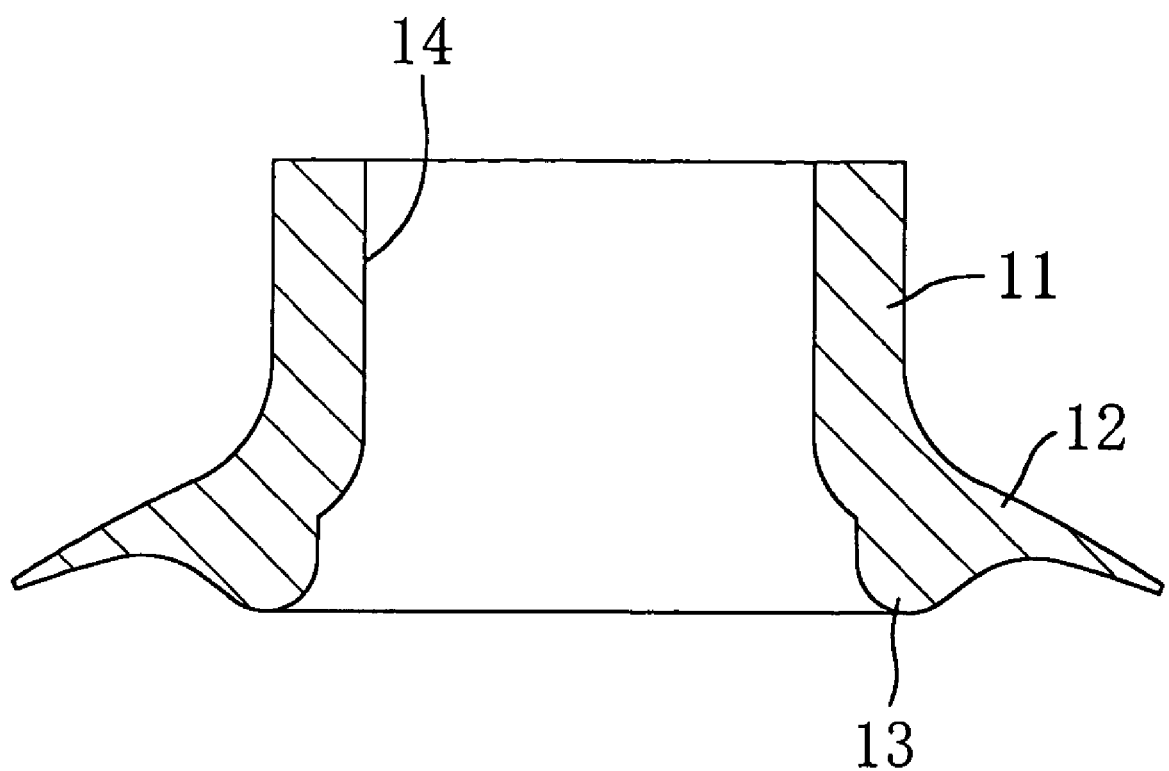
FIG. 5 is a longitudinal cross-sectional view of a reinforcing collar used for the high-pressure tank according to Embodiment 2 of the present invention.

As a feature of the present invention, a cylindrical metallic reinforcing collar 10 is engaged integrally onto the exterior of the tank body 2 between the cylindrical gas discharge section 5 and the dome section 4 by shrink fitting. The reinforcing collar 10 is, as also shown in FIG. 5, composed of a cylindrical part 11 of circular cross section having substantially the same thickness as the cylindrical gas discharge section 5, and an extension 12 formed integrally at the lower end of the cylindrical part 11 to extend outwardly. The extension 12 is gradually reduced in thickness proceeding to its outer edge, so that the outer edge of the extension 12 merges with the exterior of the dome section 4 smoothly. In this embodiment, in relation to the fitting recess 9 of the dome section 4, the back of the extension 12 is formed integrally with an annular boss 13 which protrudes downwardly. The reinforcing collar 10 is formed internally with a fitting hole 14 which passes through the cylindrical part 11 and the extension 12 vertically. The reinforcing collar 10 is made of a steel alloy, such as SNCM440, SCM440 or SKD61, or a titanium alloy and formed by forging or turning. Materials for the reinforcing collar, however, are not limited to the above but need only be those higher in strength-to-weight ratio than aluminum. Such materials make a great contribution to weight reduction. Further, the cylindrical part 11 of the reinforcing collar 10 is fitted integrally on the cylindrical gas discharge section 5 of the tank body 2 with the cylindrical gas discharge section 5 inserted in the fitting hole 14, and the extension 12 of the reinforcing collar 10 is bonded integrally to the exterior of the dome section 4 by shrink fitting with the boss 13 fitted in the fitting recess 9 of the dome section 4.

As described above, the cylindrical gas discharge section 5 and the neighboring dome section 4 has a larger thickness as compared with the cylindrical middle section 3. The fitting of the reinforcing collar 10 on these sections can further increase their effective thickness, and in addition increase their strength much more in combination with the mechanical properties of a steel alloy or a titanium alloy which is a material for the reinforcing collar 10. Furthermore, since the boss 13 of the reinforcing collar 10 is fitted into the fitting recess 9 of the dome section 4, this provides a firm engagement between the tank body 2 and the reinforcing collar 10. Moreover, the existence of the annular boss 13 increases the thickness of that particular portion of the reinforcing collar 10 and thereby increases the strength accordingly. Accordingly, there can be provided a high-pressure tank 1 strong enough to withstand high-pressures of 35 to 75 MPa.

Further, since the fitting position of the reinforcing collar 10 is not the entire tank body 2 but limited to the dome section 4 and the cylindrical gas discharge section 5 which are likely to concentrate stress, this avoids a large increase in weight of the high-pressure tank 1, thereby keeping its lightness in weight, and provides facilitated fabrication and reduced cost. Furthermore, since the tank body 2 is made of an aluminum alloy and therefore light in weight, the tank weight can be further reduced as a whole.

Next, description will be made about an example of fabrication methods for the high-pressure tank 1 having the above-described structure.

Figure 6A:
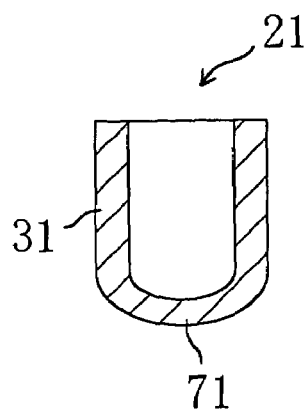
FIG. 6A is a longitudinal cross-sectional view of a short hollow cylindrical blank provided for flow forming included in a fabrication process from a blank to a finished product of the high-pressure tank according to Embodiment 2 of the present invention.

First, prepared is a short hollow cylindrical blank 21 of an aluminum alloy as shown in FIG. 6A. The short hollow cylindrical blank 21 is formed, for example, by forging a solid cylindrical billet, which is not shown, and has the shape of an end-closed cylinder in which a cylindrical middle section 31 is formed integrally with a bottom section 71. Alternatively, the shape of an end-closed cylinder may be formed by drawing a disk-shaped material with a die and a punch.

Figure 6B:
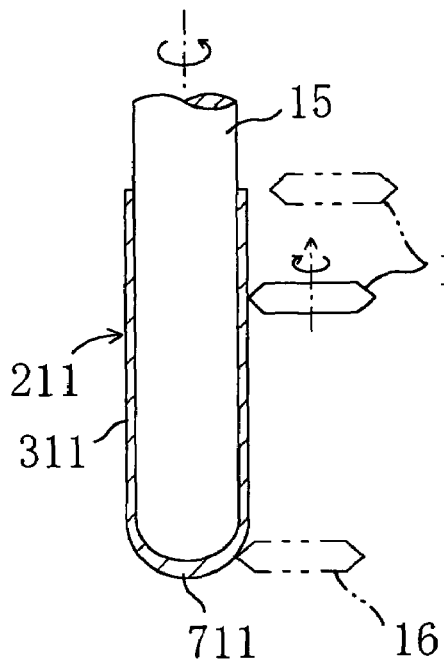
FIG. 6B is a diagram showing a flow forming step included in the fabrication process from a blank to a finished product of the high-pressure tank according to Embodiment 2 of the present invention.

Then, the short hollow cylindrical blank 21 is flow formed. The manner of the flow forming is as shown in FIG. 6B: the short hollow cylindrical blank 21 is fitted on a mandrel 15, the mandrel 15 is rotated on its axis to rotate the short hollow cylindrical blank 21 as a single unit, and a forming roll 16 is pressed against the outer periphery of the short hollow cylindrical blank 21 to rotate while applying force to the middle section 31 in the axial direction. In this manner, the short hollow cylindrical blank 21 is plastically deformed to form an elongated hollow cylindrical blank 211. At this stage, the thicknesses of a middle section 311 and a bottom section 711 become equal to those of a middle section 3 and a bottom section 7 of a tank body 2 in a tank as a final product.

Figure 6C:
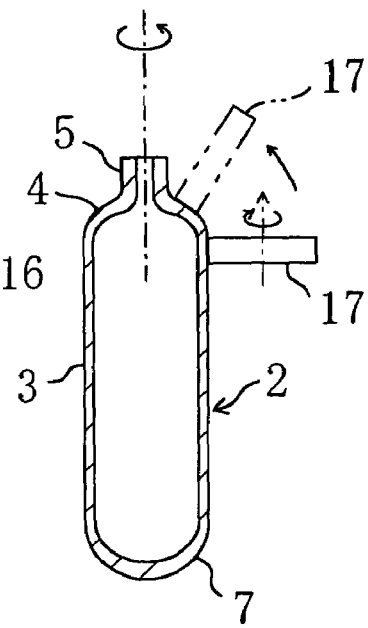
FIG. 6C is a diagram showing a spinning step included in the fabrication process from a blank to a finished product of the high-pressure tank according to Embodiment 2 of the present invention.

Subsequently, the elongated hollow cylindrical blank 211 is held by an unshown chucking device, and a predetermined region starting from the opening end is necked by spinning. The manner of the necking in process is as shown in FIG. 6C: the elongated hollow cylindrical blank 211 is rotated on its axis, and in this state a forming roll 17 is pressed in an inclined position against the predetermined region starting from the opening end of the elongated hollow cylindrical blank 211 to rotate while moving obliquely with respect to the axis of the elongated hollow cylindrical blank 211. In this manner, the predetermined region starting from the opening end of the elongated hollow cylindrical blank 211 is plastically deformed, resulting in the formation of a tank body 2 in which a cylindrical gas discharge section 5 is protruded integrally from one end of a cylindrical middle section 3 through a dome section 4. The tank body 2 is formed so that the dome section 4 is gradually increased in thickness proceeding from the cylindrical middle section 3 to the cylindrical gas discharge section 5 through the necking by spinning as described above.

Figure 6D:
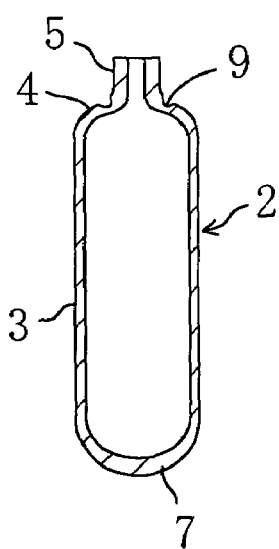
FIG. 6D is a longitudinal cross-sectional view showing a state that a dome section of a tank body is formed with a fitting recess in the fabrication process from a blank to a finished product of the high-pressure tank according to Embodiment 2 of the present invention.

Then, the tank body 2 is loaded into a cutting machine, and as shown in FIG. 6D, an annular fitting recess 9 is formed circumferentially in the exterior of the tank body 2 in the vicinity of the boundary between the dome section 4 and the cylindrical gas discharge section 5.

Figure 6E:
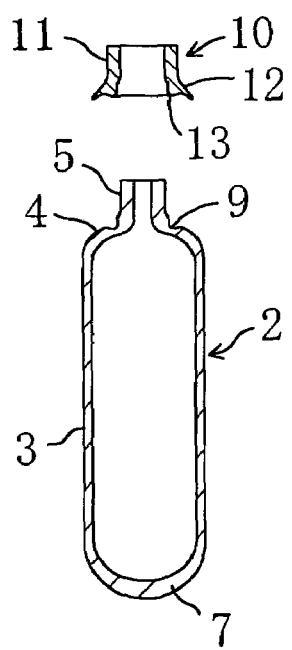
FIG. 6E is a longitudinal cross-sectional view showing a state before a reinforcing collar is fitted onto the tank body by shrink fitting in the fabrication process from a blank to a finished product of the high-pressure tank according to Embodiment 2 of the present invention.

Thereafter, as shown in FIG. 6E, prepared is a reinforcing collar 10 of a steel alloy or a titanium alloy obtained by an additional forging or turning. As described above, the reinforcing collar 10 has a cylindrical part 11 and an extension 12 formed integrally at the lower end of the cylindrical part 11, the back of the extension 12 is formed integrally with an annular boss 13, and the reinforcing collar 10 is formed internally with a fitting hole 14 which passes through the cylindrical part 11 and the extension 12 vertically (see FIG. 5). The inner diameter of the fitting hole 14 is selected by taking into consideration a fitting allowance for shrink fitting relative to the outer diameter of the cylindrical gas discharge section 5.

Figure 6F:
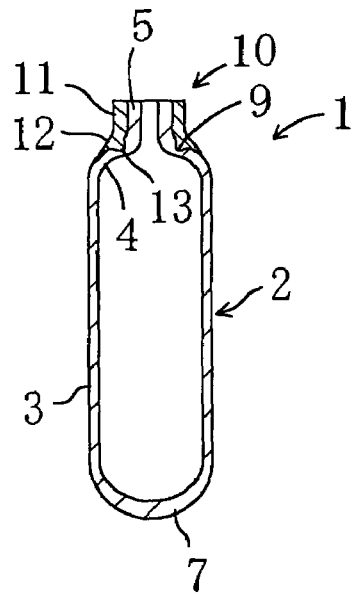
FIG. 6F is a longitudinal cross-sectional view showing a state that the reinforcing collar is fitted onto the tank body by shrink fitting in the fabrication process from a blank to a finished product of the high-pressure tank according to Embodiment 2 of the present invention.

Then, as shown in FIG. 6F, the reinforcing collar 10 is fitted onto the cylindrical gas discharge section 5 of the tank body 2 so that the boss 13 of the reinforcing collar 10 is fitted in the fitting recess 9 of the dome section 4. Subsequently, the reinforcing collar 10 is engaged integrally on the exterior of the tank body 2 between the cylindrical gas discharge section 5 and the dome section 4 by shrink fitting.

As can be understood from the above, the additionally prepared reinforcing collar 10 need only be fitted onto the cylindrical gas discharge section 5 of the tank body 2. Accordingly, a high-pressure tank 1 can be fabricated easily without requiring much labor. Furthermore, since the thickness of the portion of the reinforcing collar 10 fitted with the fitting recess 9 is increased, the strength of that portion is increased accordingly.

In Embodiments 1 and 2 described above, an end-closed cylindrical blank is illustrated as the short hollow cylindrical blank 21 provided for flow forming. However, the short hollow cylindrical blank 21 may be a hollow cylinder both ends of which are open. In this case, predetermined regions respectively starting from both opening ends will be necked by spinning.

What is claimed is:

1. A high-pressure tank comprising:
a metallic tank body in which a cylindrical gas discharge section is protruded integrally from one end of a cylindrical middle section through a dome section; and
a cylindrical metallic reinforcing collar fitted onto the cylindrical gas discharge section of the tank body and subsequently engaged integrally on the exterior of the tank body between the cylindrical gas discharge section and the dome section by shrink fitting,
wherein the metallic tank body is formed by plastically deforming a hollow cylindrical blank of metal with rotation, and
the dome section in the vicinity of the boundary of the cylindrical gas discharge section and the cylindrical gas discharge section are increased in thickness as compared with the cylindrical middle section.

2. The high-pressure tank of claim 1, wherein
the reinforcing collar is formed of a cylindrical part fitted onto the cylindrical gas discharge section of the tank body, and an extension extended radially outwardly from one end of the cylindrical part, the back of the extension being formed with an annular boss, and
the exterior of the tank body is formed with an annular fitting recess in the vicinity of the boundary between the dome section and the cylindrical gas discharge section so that the annular boss is fitted into the annular fitting recess with the reinforcing collar engaged on the exterior of the tank body between the cylindrical gas discharge section and the dome section.

3. The high-pressure tank of claim 1 or 2, wherein the reinforcing collar is made of a steel alloy or a titanium alloy.

4. The high-pressure tank of claim 1 or 2, wherein the tank body is made of an aluminum alloy.

* * * * *